(No Model.)

C. P. COLLINS.
COTTON PICKER'S WAGON.

No. 276,778. Patented May 1, 1883.

Attest:
Charles Pickles
Wm. J. Sayers

Inventor:
Chas. P. Collins
By Knight Bros
Attys

UNITED STATES PATENT OFFICE.

CHARLES P. COLLINS, OF SAN MARCOS, TEXAS.

COTTON-PICKER'S WAGON.

SPECIFICATION forming part of Letters Patent No. 276,778, dated May 1, 1883.

Application filed September 2, 1882. (No model.)

*To all whom it may concern:*

Be it known that I, CHARLES P. COLLINS, of San Marcos, in the county of Hays and State of Texas, have invented a certain new and useful Improvement in Cotton-Pickers' Wagons, of which the following is a full, clear, and exact description, reference being had to the accompanying drawings, forming part of this specification, and in which—

Figure 1:
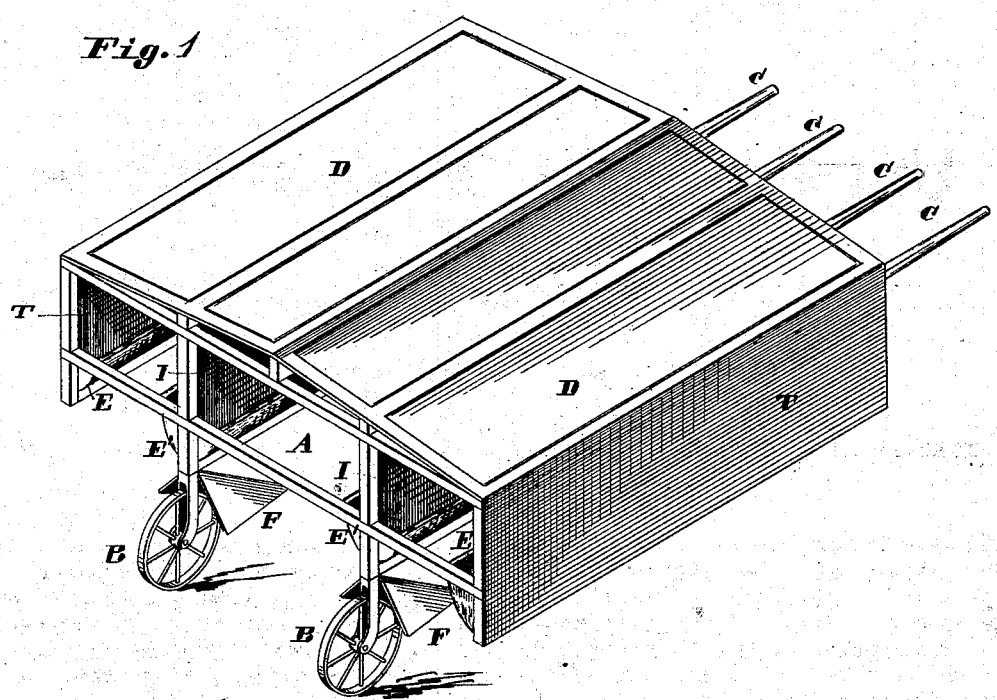
Figure 2:
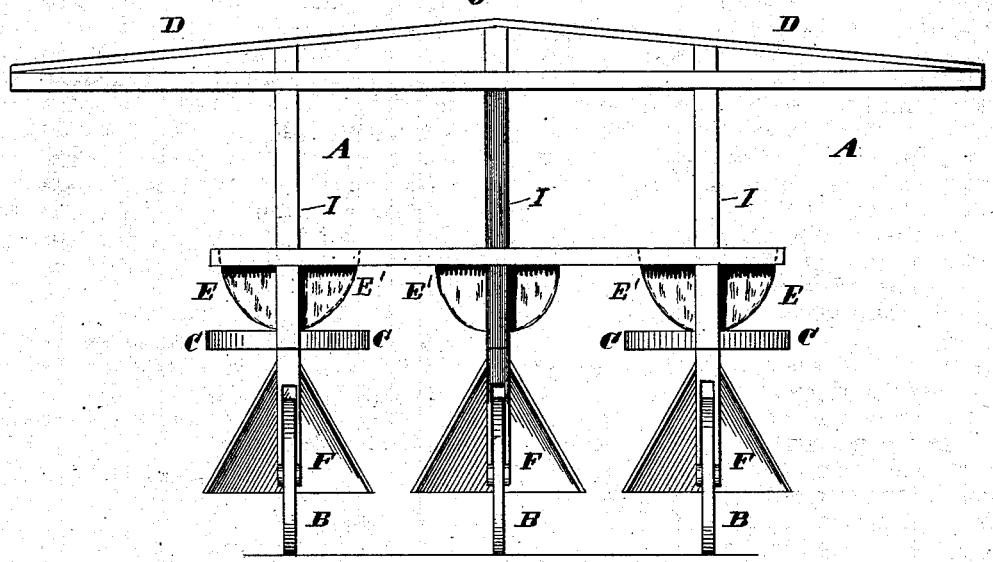

Figure 1 is a perspective view. Fig. 2 is a rear view of the same, showing another arrangement of the troughs.

My present invention relates to an improvement on Letters Patent No. 253,980, granted to me February 21, 1882; and it consists in certain novel features hereinafter fully described and claimed.

A represents the frame-work; B, the supporting-wheels; C, the draft-shafts; D, the top covering, of canvas or other suitable material; E, the receiving-troughs, and F the separators.

In practice it has been found necessary to close the sides of the wagon, so that when there is any breeze the cotton will not be blown away as the pickers throw it to the troughs. To this end I secure to the sides of the top covering, D, or extension of the same, side curtains, T T, which are secured by their lower edges to the outer portion of the outer troughs, E.

It has been found necessary to construct the wagon with more than two troughs at times, so that a number of pickers can use it; and where cotton is picked for so much per pound, as is generally the case, it is necessary that each picker's cotton should be kept separate, so that it can be weighed by itself. To this end I either extend the frame, and secure troughs E (see Fig. 1) to the outer sides and provide them with the side curtains, T, or else arrange troughs E' in the center of the wagon, (see Fig. 2,) between the two outer troughs, E, and in either case the inside troughs would be provided with a partition, I, of canvas or other suitable material, (see Fig. 1,) so that the pickers using these troughs on opposite sides will not have their cotton mixed, as explained.

Instead of using four supporting-wheels, as shown in my former patent, three only would answer the purpose, as shown in Fig. 2; or five may be used.

I claim as my invention—

In a cotton-picker's wagon, the combination of the frame A, supporting-wheels B, cover D, side curtains, T, troughs E E', and partitions I, all substantially as shown and described, for the purpose set forth.

CHARLES P. COLLINS.

Witnesses:
SAML. KNIGHT,
GEO. H. KNIGHT.